Nov. 13, 1951   J. McCOY ET AL   2,574,579

CABLE CONNECTOR

Filed July 28, 1947

JOE McCOY
EARL O. WEINING
INVENTORS

BY Hubert Miller

ATTORNEY

Patented Nov. 13, 1951

2,574,579

UNITED STATES PATENT OFFICE 2,574,579

CABLE CONNECTOR

Joe McCoy and Earl O. Weining, Wichita, Kans., assignors to Boeing Airplane Company, Wichita, Kans.

Application July 28, 1947, Serial No. 764,114

4 Claims. (Cl. 24—123)

This invention relates to couplings, more particularly to cable couplings, and is especially useful where a coupling is needed which will serve as a splicing link for a cable run, or which will serve as a means of quickly disconnecting two parts of a cable, rope, wire, or the like.

The primary object of the invention is to provide a coupling which normally serves to connect two ends of a cable together without any danger of their becoming accidentally disconnected in case the cable slackens, yet which permits the connected ends of the cable to be easily and quickly disconnected when desired. Other objects will be apparent from a consideration of this specification in connection with the accompanying drawings.

Generally the above specified object is accomplished by the provision of a rigid metal shell with suitable holes and connecting slots to receive and releasably lock the enlarged cable ends in position, and the invention is illustrated in the accompanying drawings in which—

Figure 1:
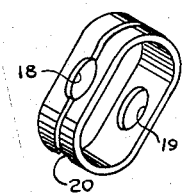
Figure 1 is an isometric view of one form of shell embodying the invention.
Figure 7:
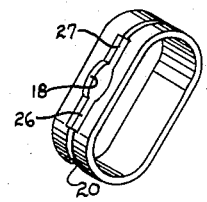
Figure 7 is an isometric view of a modified form of shell embodying the invention.
Figure 2:
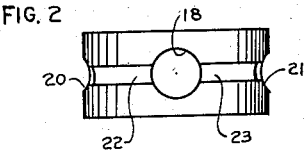
Figure 2 is a top plan view of this shell.
Figure 8:
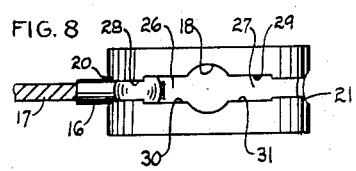
Figure 8 is a top plan view of the Figure 7 shell, showing only one cable end in position.
Figure 3:
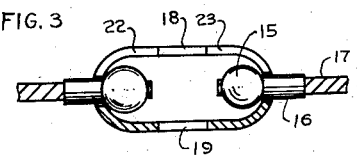
Figure 3 is a central vertical section of the shell connecting two cable ends together.
Figure 9:
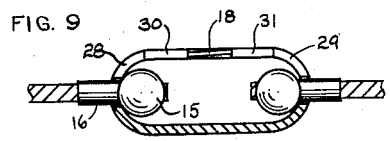
Figure 9 is a central vertical section through the Figure 7 shell.
Figure 4:
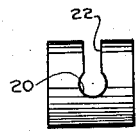
Figure 4 is an end view of the same shell with cable ends removed.

While the invention has been shown associated with cable ends of the ball type having integral elongated collars which are ordinarily swaged on the cable end proper, it may be used to connect cable ends having various other types of enlarged end fittings, by appropriate changes in the size and shape of the slots and holes in the shell.

The coupling illustrated in Figures 1 to 6 inclusive is designed to couple cable ends which are provided with an enlarged metal stop 15, which is ordinarily in the form of a ball, and an integral cylindrical metal collar 16, this end fitting being swaged or otherwise firmly secured to the cable 17.

The coupling itself consists of a hollow shell made from a short length of seamless tubing partially flattened so that it has an elongated O-cross section, as shown. The opposite side walls of the shell are provided with apertures 18 and 19 which are substantially in alignment and which are sufficiently large to admit the balls 15. The arcuate end walls of the shell are provided with apertures 20 and 21 which are sufficiently large to freely receive the cable end collars 16 longitudinally, but which are smaller in size than the balls 15. One side aperture 18 is connected to each of the end apertures 20 and 21 by slots 22 and 23, which are of sufficient width to admit the cable 17 proper, but not the collars 16.

Figure 6:
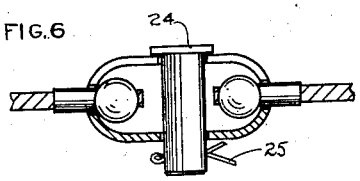
Figure 6 is a central vertical section similar to Figure 3, but shows the additional use of a lock pin to prevent accidental disconnection of the cable ends.

To couple the cable ends together first one and then the other ball type end fitting is passed endwise through the aperture 18 until the ball enters the aperture 19 and until the outer end of the collar is entirely inside the shell. The end fitting is then moved substantially in the plane of the slot until the outer end of the collar aligns with one of the end apertures 20. Endwise movement of the fitting then brings it into the position shown in Figure 3. It will be seen that with both cable end fittings in this position the narrow slots 22 and 23 prevent the collars 16 from leaving their respective end apertures 20 and 21. The fittings are thus locked inside the shell even when the cable slackens. As a second safety lock, however, a pin 24 may be passed through the apertures 18 and 19, as shown in Figure 6, and secured in position by a cotter pin 25, or other suitable means. The use of the pin 24 is of course optional, because the cable ends cannot emerge from the coupling without first being moved endwise inwardly until the ball enters the aperture 19, and until the outer end of the collar clears its aperture. It must then be forcibly moved, as shown by the arrows in Figure 5, until the collar aligns with the aperture 18. The entire fitting may then pass vertically outward through this opening.

The primary difference between the coupling just described and the embodiment illustrated in Figures 7 to 11 inclusive lies in the shape of the slots 26 and 27 which connect the aperture 18 with the two end apertures 20 and 21. As will be seen in all the figures mentioned, the slots 26 and 27 are composed of narrow portions 28 and 29 communicating at one end with the end apertures 20 and 21, and wide portions 30 and 31 communicating with the narrow slots and with the ball entrance aperture 18.

The narrow slots 28 and 29 are wide enough to receive the cable 17 only, while the wide slots 30 and 31 will permit passage of the collar 16. These slots 30 and 31 are just slightly longer than the collars 16.

To couple two cable ends together with this coupling it is only necessary to move each cable end longitudinally over the shell until the ball 15 aligns with the aperture 18 and the collar 16 aligns almost perpendicularly with the slots 26 and 27. The cable ends are then moved directly into the inside of the shell one at a time until the collars 16 align longitudinally with the end apertures 20 and 21. The movement is then endwise outwardly until the cable end fittings assume the positions shown in Figures 9 and 11. In this position the collars 16 are locked in the end apertures 20 and 21 by the narrowness of the slots 28 and 29. In this embodiment it will be noted that the aperture 18 is threaded to receive a complemental locking plug 32, and that the aperture 19 of the first described embodiment is omitted entirely.

Figure 10:
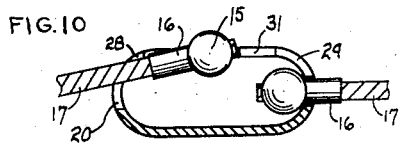
Figure 10 is a central vertical section similar to Figure 9, and shows the required movement of a cable end to accomplish disconnection from this modified shell.
Figure 5:
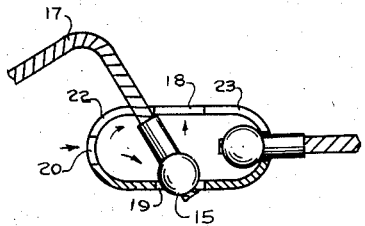
Figure 5 is a central vertical section similar to Figure 3, but shows the required movement of a cable end to accomplish disconnection.
Figure 11:
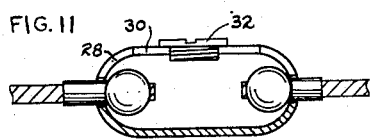
Figure 11 is a view similar to Figure 9, but shows a threaded locking element seated in the shell to positively prevent accidental disconnection of the cable ends.

To disconnect the cable ends, the plug 32 is removed, one cable end is moved inwardly until the ball 15 and its collar 16 align with the aperture 18 and wide portion 30 or 31 of the slots 26 and 27. The end fitting may then be moved outward through the wall of the shell as shown in Figure 10.

From this description it will be seen that a simply constructed swivel type coupling has been provided; one which facilitates the temporary or permanent joining of two cable ends; one which is adaptable by slight changes in the size and shape of slots used to cooperate with any standard or commonly used enlarged cable end; and one which is positive in locking the cable ends against accidental disconnection during use, even when the cable slackens.

Having described the invention with sufficient clarity as to permit it to be made and used by others, we claim:

1. A coupling for a pair of cable ends each of which is enclosed in a cylindrical collar of substantially larger diameter than the cable, and has an enlarged stop fixed on the outer end of each collar, said coupling comprising: an elongated rigid one piece hollow shell having holes in its opposite end walls barely of sufficient diameter to longitudinally receive said collars; a larger hole in one side wall of the shell of a size and shape to freely admit said stops; a primary slot of a constant width less than the diameter of said larger hole and only slightly greater than the diameter of said collars communicating with the larger hole and extending in opposite directions therefrom to points respectively intermediate that hole and the two end wall holes; and a pair of narrower constant width secondary slots each communicating with an outer end of the primary slot and with the adjacent end wall hole, and of insufficient width to permit the passage of said collars and sufficiently wide to permit the free passage of the cable proper.

2. The coupling described in claim 1 and means removably plugging said larger side wall hole.

3. A coupling for a pair of cable ends each of which is enclosed in an elongated cylindrical collar of substantially larger diameter than the cable, and each collar has a spherical stop of larger diameter fixed on its outer end, said coupling comprising: an elongated endless loop of sheet material constituting a hollow shell; a centrally positioned circular aperture through one side wall of the shell of sufficient diameter to freely admit said stops; aligned circular apertures through the opposite end walls of the shell only of sufficient diameter to longitudinally receive said collars; a longitudinally disposed primary slot of constant width passing centrally through the side wall aperture, the opposite ends of said slot terminating short of the respective end wall apertures, the width of said slot being barely sufficient to permit the passage of said collars; and a pair of narrower longitudinally disposed secondary slots in said shell, each communicating centrally with an outer end of the primary slot and centrally with the adjacent end wall hole, each secondary slot being of constant width insufficient to permit the entrance of said collars and barely sufficient to freely receive the cable proper.

4. The coupling described in claim 3 and means removably plugging the side wall aperture.

JOE McCOY.
EARL O. WEINING.

REFERENCES CITED

The following references are of record in the file of this patent:

UNITED STATES PATENTS

| Number | Name | Date |
|---|---|---|
| 1,157,917 | Allen | Oct. 26, 1915 |
| 1,380,244 | Otis | May 31, 1921 |
| 1,408,212 | Leinbach | Feb. 28, 1922 |
| 1,585,107 | Porte | May 18, 1926 |
| 1,724,835 | Goodridge | Aug. 13, 1929 |
| 1,829,232 | Morehouse | Oct. 27, 1931 |
| 2,440,012 | Haver | Apr. 20, 1948 |